May 16, 1939.　　　　G. D. PEET　　　　2,158,985
GAS SUPPLY APPARATUS
Filed Aug. 15, 1936
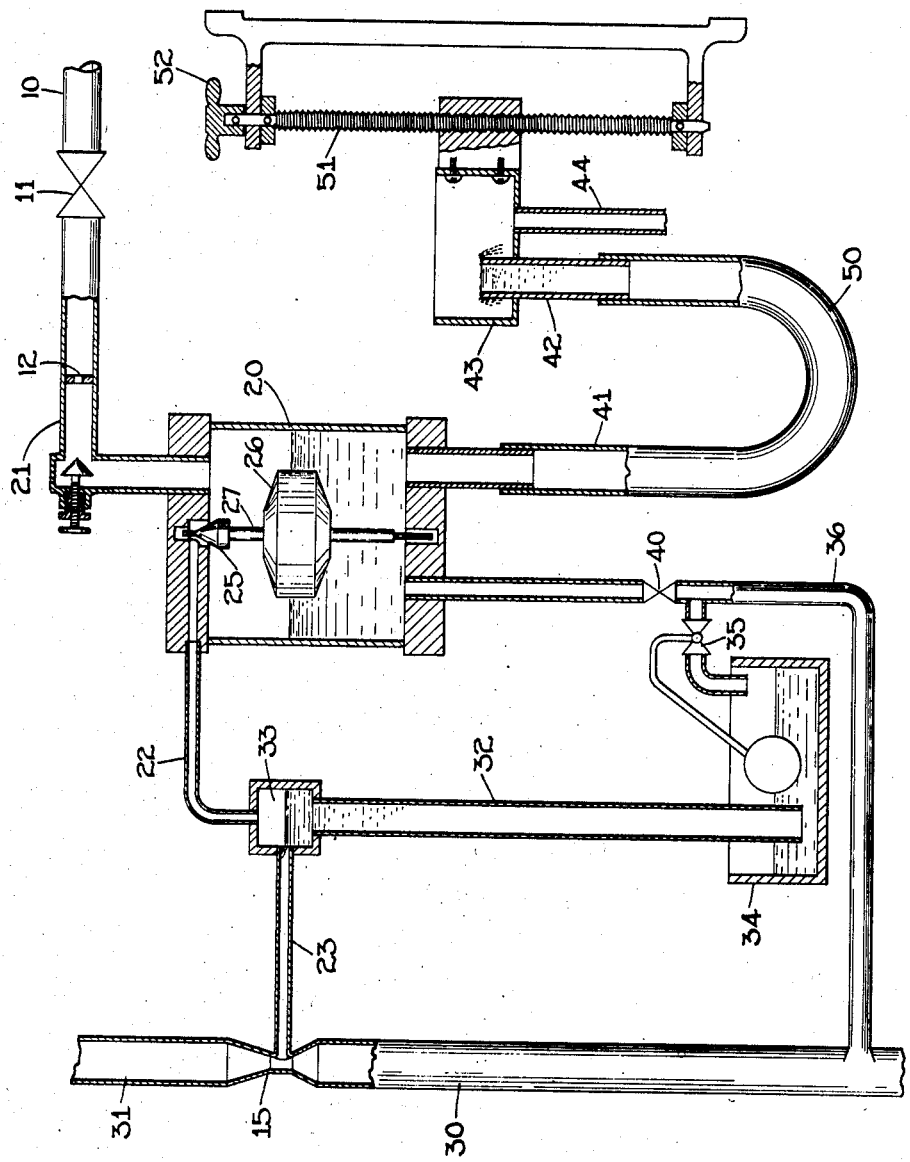
INVENTOR
Gerald D. Peet
BY
his ATTORNEY Patented May 16, 1939

2,158,985

UNITED STATES PATENT OFFICE 2,158,985

GAS SUPPLY APPARATUS

Gerald D. Peet, Montclair, N. J., assignor to Wallace & Tiernan Company, Inc., Belleville, N. J., a corporation of New York Application August 15, 1936, Serial No. 96,243

11 Claims. (Cl. 210—28)

This invention relates to apparatus for moving gases by means of a controlled partial vacuum, or negative pressure, and more particularly to means for controlling the negative pressure produced by a Venturi aspirator applied to a flow-controlling orifice or other flow-resisting passage for drawing gas therethrough. The invention aims to obtain a more accurate control of the rate of flow of the gas than has heretofore been found possible, especially at comparatively high rates of flow, and to accomplish this by controlling the flow-determining negative pressure by means which makes it possible to maintain a very constant and readily adjustable negative pressure.

The invention has been made especially with the idea of providing an improved apparatus for introducing gaseous chlorine at a controlled rate into a minor stream of water to produce a solution to be used for the treatment of water or sewage or for other uses. Such apparatus, in which chlorine gas supplied at a constant substantially atmospheric pressure is drawn through a flow-controlling orifice by a water aspirator, is shown in patents of Wallace Nos. 1,777,986 and 1,777,987, and in the Peet Patent 2,086,957. In apparatus shown in the Wallace patents and in the Peet patent the pulling capacity of the aspirator is somewhat greater than sufficient to draw gas at the maximum desired rate through the control orifice, and the excess capacity of the aspirator is satisfied by make-up water supplied to the gas inlet passage of the aspirator under a negative head which determines the partial vacuum or negative pressure available for sucking the gas. In the apparatus of the Wallace Patent No. 1,777,986 the negative head under which the make-up water is supplied to the aspirator is constant, and the suction head transmitted to the control orifice is adjusted by means of an adjustable restriction for varying the flow-resistance between the orifice and the aspirator. In the apparatus of the Wallace Patent No. 1,777,987 the amount of chlorine drawn through the orifice by the aspirator and supplied to flowing water is varied proportionately to variations in the quantity of flowing water to be treated by varying according to the quantity of water flowing the negative head against which the make-up water is raised by the aspirator, and an adjustable restriction between the orifice and the aspirator is provided for varying the dosage. In the apparatus of the Peet patent the negative head under which the make-up water is supplied to the aspirator is varied at will for adjusting as desired the negative pressure in the suction passage and thereby the amount of chlorine drawn through the orifice.

Apparatus such as shown by said patents, while quite satisfactory when the flow rate of the gas is comparatively low, does not operate with the desired degree of smoothness and resulting accuracy for supplying the gas at higher flow rates. The negative pressure in the suction passage as determined by supplying make-up water to the aspirator under a negative head is not without an appreciable degree of fluctuation which increases with the size of the apparatus and under certain conditions of operation, and any variation of this negative pressure is transmitted to the flow-controlling orifice.

In apparatus according to the present invention, the degree of vacuum transmitted to the flow-controlling orifice is determined by a variable restriction in the flow passage between the aspirator and the orifice, which is automatically controlled by means responsive to the negative pressure between the restriction and the orifice to maintain said negative pressure at the desired value and is adjustable for varying the maintained negative pressure and resulting gas flow rate; and in combination with such automatically and adjustably controlled restriction for determining the negative pressure transmitted to the orifice, I provide means for controlling and limiting the negative pressure or degree of vacuum between the aspirator and said restriction, such means most desirably being means for supplying make-up water to the excess capacity aspirator under a negative head. The desired degree of accuracy of control of the gas flow rate cannot be obtained by the make-up water supply means alone, or by other means for maintaining a constant negative pressure on the suction side of the aspirator which is not entirely accurate in operation, for the reason pointed out above; and the automatically adjusted restriction alone is not satisfactory for the reason that without provision of some means for preventing increase in the degree of vacuum between the restriction and the aspirator the increase in the degree of this vacuum as the restriction is closed to reduce the flow rate of the gas may result in an undesirably large pressure drop across the restriction with resulting trouble from valve wear and valve leak and formation of hydrate from the moist chlorine gas. By combining the two control means between the aspirator and the flow controlling orifice, these difficulties are practically eliminated. The automatic valve, or restriction, responds to and flattens out any variation in the negative pressure between it and the aspirator and transmits an accurately controlled negative pressure of the desired value to the control orifice; and the make-up water supply means or other means provided for controlling the degree of vacuum maintained between the automatic valve and the aspirator prevents trouble in the operation of the automatic valve which might otherwise result from undesirable increase in the degree of vacuum at the discharge side of the automatic valve.

A full understanding of the invention can best be given by a detailed description of an approved form of chlorine supply apparatus according to the invention, and such a description will now be given in connection with the accompanying drawing, which is a diagrammatic sectional view of such an apparatus.

Referring to the drawing, chlorine gas from a tank of liquefied chlorine or other suitable source of supply under pressure is supplied through a tube 10 to a pressure reducing valve 11 by which the gas is supplied at a constant substantially atmospheric pressure to a flow-controlling orifice 12. The gas is drawn through the flow-controlling orifice by the suction of a water aspirator 15. A float chamber 20 is connected between the orifice 12 and the aspirator by a tube 21 leading from the orifice to the float chamber and tubes 22 and 23 leading from the float chamber to the aspirator. The outlet from the float chamber to the tube 22 is controlled by a float-controlled valve 25, which, as shown, is connected directly to the float 26, the valve and float being suitably guided, as by means of the extended ends of the rod 27 extending into guide openings at the top and bottom of the float chamber. In operation the aspirator maintains a partial vacuum, or negative pressure, in the suction passage 22 which exceeds the negative pressure desired to be maintained on the downstream side of the orifice 12, and the exact negative pressure transmitted to the orifice is determined by the restriction at the valve 25.

The aspirator 15 is formed by a small Venturi tube and is supplied with water from a source under suitable pressure through a pipe 30 and discharges the water and entrained and dissolved chlorine through a tube 31 from which this minor flow of water may be discharged into a main flow or body of water to be treated or may be otherwise utilized. To maintain the negative pressure between the aspirator and the automatic valve 25 substantially constant, a water column tube 32 extends downward from a suction chamber 33 connected between the tubes 22 and 23. The lower end of the water column tube is open and extends down below the water level in a constant level tray 34 to which water is supplied past a float-controlled valve 35 from any suitable source of supply, as from the aspirator supply pipe 30 through a tube 36. The pulling capacity of the aspirator must be sufficiently great compared to the size of the orifice 12 to maintain the negative pressure in the chamber 33 and tube 22 sufficient to raise the water in the tube 32 from its normal water level, which is the level in the tray 34, up to the level of the inlet to the tube 23. The degree of vacuum, or negative pressure, maintained in the chamber 33 and tube 22 will then be determined by the negative head of the column of water raised in the tube 32, the excess capacity of the aspirator being satisfied by the make-up water drawn through the tube 32. A negative pressure will thus be maintained on the downstream side of the valve-controlled outlet from the float chamber 20, which is practically constant for low flows but fluctuates more or less as the gas flow increases.

The float chamber 20 is supplied with a constant small flow of water through the tube 36, the flow being controlled by a valve 40, and an outlet from the chamber is provided by a downwardly extending tube 41 connected at its lower end to an upwardly extending overflow tube 42, the two forming a U-tube. From the end of the tube 42 the water falls into an open box 43 from which it flows to waste through a tube 44. There is thus provided means for supplying water to the float chamber under a negative head which is determined by the elevation of the outlet end of the overflow tube 42, and the water level within the float chamber is determined by this negative head and the degree of vacuum or negative pressure within the chamber.

As the water level within the chamber determines the elevation of the float, and the float operates the valve 25 which controls the negative pressure maintained in the chamber, this negative pressure is determined by the negative head against which the water is raised in the chamber. The negative head against which the water is raised in the chamber thus determines the pressure drop across the orifice, the negative pressure within the chamber and tube 21, and, therefore, the pressure drop across the orifice, to which the gas is supplied under a constant pressure, being maintained constant for any constant negative head, and being varied as the negative head varies.

In the operation of the apparatus, if the degree of vacuum or negative pressure in the chamber 20 and tube 21 is greater than it should be to produce the desired pressure drop across the orifice for producing the desired gas flow, the water in the chamber 20 rises and the float gives a closing movement to the valve 25, thus reducing the negative pressure in the chamber. If the degree of vacuum in the chamber and tube 21 is less than it should be, then the water level in the chamber falls and the downward movement of the float moves the valve away from its seat to increase the degree of vacuum or negative pressure in the chamber. The valve 25 is thus automatically adjusted to maintain a degree of vacuum or negative pressure in the float chamber and tube 21 corresponding to the negative head against which water is supplied to the chamber regardless of minor fluctuations of negative head in tube 22.

The degree of vacuum maintained in the chamber may be varied for varying the pressure drop across the orifice and thereby the gas flow rate, by varying the negative head against which the water is supplied to the chamber. As this negative head depends on the elevation of the overflow outlet of the U-tube and the air pressure at the outlet, it may be varied by varying either the elevation of the outlet or the air pressure at the outlet. In the construction shown, the outlet is open to atmospheric pressure, and the negative head is varied by varying the elevation of the overflow end of the U-tube. In the conventional means shown for accomplishing this adjustment of the elevation of the overflow end of the U-tube, the bent portion of the U-tube is formed by a flexible tube 50 and the overflow box 43 is mounted on a vertical screw rod 51 journaled in suitable brackets and adapted to be turned by a hand-wheel 52. By turning the screw rod in one direction or the other, the overflow box and overflow end of the U-tube may be raised or lowered as desired, thereby effecting the desired adjustment of the negative head under which water is supplied to the float chamber.

Instead of supplying water to the float chamber, the water might obviously be supplied to the box 43 through a float controlled valve for maintaining a constant level above the end of tube 42 with an overflow outlet at that level.

What is claimed is:

1. The combination with flow-controlling means and means for supplying gas at a constant substantially atmospheric pressure to the flow-controlling means and a suction device for producing a negative pressure for drawing the gas through the flow-controlling means, of means providing an adjustable restriction in the flow passage between the flow-controlling means and the suction device, means responsive to variations in the negative pressure between the flow-controlling means and said restriction for adjusting said restriction to maintain said negative pressure constant, and means for controlling the negative pressure at the discharge side of said restriction to prevent excessive variation thereof.

2. The combination with flow-controlling means and means for supplying gas at a constant substantially atmospheric pressure to the flow-controlling means and a suction device for producing a negative pressure for drawing the gas through the flow-controlling means, of means providing an adjustable restriction in the flow passage between the flow-controlling means and the suction device, means responsive to variations in the negative pressure between the flow-controlling means and said restriction for adjusting the restriction to maintain a desired drop in pressure across the flow-controlling means adjustable for varying the drop in pressure across the flow-controlling means maintained by said pressure responsive means, and means for maintaining the negative pressure at the discharge side of said restriction substantially constant.

3. The combination with flow-controlling means and means for supplying gas at a constant substantially atmospheric pressure to the flow-controlling means and a suction device for producing a negative pressure for drawing the gas through the flow-controlling means, of a float chamber connected between the flow-controlling means and the suction device, means providing an adjustable restriction for controlling the flow of gas from said chamber, means for supplying water to said chamber under a negative head, a float in said chamber for controlling said restriction to cause a closing of the restriction when the water rises above a predetermined level and to cause an opening of the restriction when the water falls below a predetermined level, and means for maintaining the negative pressure at the discharge side of said restriction substantially constant.

4. The combination with flow-controlling means and means for supplying gas at a constant substantially atmospheric pressure to the flow-controlling means and a suction device for producing a negative pressure for drawing the gas through the flow-controlling means, of a float chamber connected between the flow-controlling means and suction device, means providing an adjustable restriction for controlling the flow of gas from said chamber, means for supplying water to said chamber under a negative head, a float in said chamber for controlling said restriction to maintain the negative pressure in the chamber constant for any negative head maintained on the water in the chamber, means for varying said negative head to vary the negative pressure maintained in the chamber, and means for maintaining the negative pressure at the discharge side of said restriction substantially constant.

5. The combination with flow-controlling means and means for supplying gas at a constant substantially atmospheric pressure to the flow-controlling means and a suction device for producing a negative pressure for drawing the gas through the flow-controlling means, of means providing an adjustable restriction in the flow passage between the flow-controlling means and the suction device, means providing a control factor, means responsive to the negative pressure between the flow-controlling means and said restriction and to said control factor for adjusting said restriction to maintain a desired pressure drop across the flow-controlling means, means for varying said control factor to vary the maintained pressure drop across the flow-controlling means, and means for maintaining the negative pressure at the discharge side of said restriction substantially constant.

6. The combination with flow-controlling means and means for supplying gas at a constant substantially atmospheric pressure to the flow-controlling means and a suction device for producing a negative pressure for drawing the gas through the flow-controlling means, of a float chamber connected between the flow-controlling means and the suction device, means providing an adjustable restriction for controlling the flow of gas from said chamber, means for supplying water to said chamber, means for maintaining a negative head on the water in the chamber comprising an overflow tube the lower end of which is connected to an outlet from the chamber to form a U-tube, a float in the chamber for controlling said restriction to maintain the negative pressure in the chamber constant for any negative head maintained by said U-tube, means for varying the negative head maintained by the U-tube to vary the negative pressure maintained in the chamber, and means for maintaining the negative pressure at the discharge side of said restriction substantially constant.

7. The combination with means providing a flow-controlling orifice and means for supplying gas at a constant substantially atmospheric pressure to the orifice and a suction device for drawing the gas through the orifice, of means for maintaining a substantially constant negative pressure on the suction side of the suction device, means providing an adjustable restriction for controlling the suction head transmitted to the orifice, and means controlled by the negative pressure between the orifice and said restriction for adjusting said restriction to maintain the suction head transmitted to the orifice constant.

8. The combination with means providing a flow-controlling orifice and means for supplying gas at a constant substantially atmospheric pressure to the orifice and a suction device for drawing the gas through the orifice, of means for maintaining a substantially constant negative pressure on the suction side of the suction device, means providing an adjustable restriction for controlling the suction head transmitted to the orifice, automatically acting means for adjusting said restriction to maintain the suction head transmitted to the orifice constant, and means adjustable for affecting the operation of said automatic adjusting means for varying the suction head transmitted to the orifice.

9. The combination with means providing a flow-controlling orifice and means for supplying gas at a constant substantially atmospheric pressure to the orifice and a water aspirator for drawing the gas through the orifice, of means for maintaining a substantially negative pressure on the suction side of the aspirator by the supply of make-up water to the aspirator under a pressure-determining negative head, means providing an adjustable restriction in the flow passage between the suction device and the flow-controlling orifice, and means responsive to variations in the negative pressure between the flow-controlling orifice and said restriction for adjusting said restriction to maintain said negative pressure constant.

10. The combination with a suction device and means providing a gas suction passage leading to the suction device, of means providing an adjustable restriction in said passage, means for automatically adjusting said restriction to maintain a desired negative pressure in said passage at the inlet side of the restriction, means adjustable for varying the negative pressure maintained by said automatic means, and means for maintaining the negative pressure in said passage at the discharge side of said restriction substantially constant.

11. The combination with a suction device and means providing a gas suction passage leading to the suction device, of means providing an adjustable restriction in said passage, means responsive to the pressure at the inlet side of said restriction for adjusting the restriction to maintain said pressure constant, adjusting means for varying the flow rate of the gas by varying the pressure maintained by said pressure-responsive means, and means for controlling the pressure at the discharge side of said restriction by limiting the degree of pressure reduction by the suction device when the gas flow is reduced by the closing of said restriction.

GERALD D. PEET.